United States Patent Office 3,454,503
Patented July 8, 1969

3,454,503
PROCESS FOR REGENERATING CATION EXCHANGE RESINS
Charles F. Blankenhorn, La Habra, and Ted A. Grahek, Buena Park, Calif., assignors to Shell Oil Company, New York, N.Y., a corporation of Delaware
No Drawing. Filed July 19, 1967, Ser. No. 654,326
Int. Cl. B01j 1/08
U.S. Cl. 260—2.2   3 Claims

ABSTRACT OF THE DISCLOSURE

Improved regeneration of cation exchange resins is obtained by washing the resin with a dilute solution of an iron chelating agent between two washing steps using an electroylyte solution, i.e., a sodium chloride regenerating solution.

Background of the invention

Ion exchangers, by common definition, are insoluble solid materials which carry exchangeable cations or anions. These ions can be exchanged for a stoichiometrically equivalent amount of other ions of the same sign when the ion exchanger is in contact with an electrolyte solution. Carriers of exchangeable cations are called cation exchangers, and carriers of exchangeable anions, anion exchangers.

A typical cation exchange is

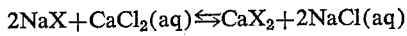

$$2\text{NaX} + \text{CaCl}_2(\text{aq}) \rightleftharpoons \underline{\text{CaX}_2} + 2\text{NaCl}(\text{aq})$$

wherein X represents a structural unit of the ion exchanger, solid phases are underlined and "aq" indicates that the electrolyte is in aqueous solution.

Ion exchange is, with very few exceptions, a reversible process. In water softening, for example, a cation exchanger which has lost all its $Na^+$ ions and thus has become "exhausted," can be "regenerated" with a solution of a sodium salt such as NaCl. In regeneration, the process noted above is reversed, and the ion exchanger is reconverted to the $Na^+$ form.

It is well-known that when a spent or exhausted cation ion exchange resin is regenerated by washing with a solution of NaCl, complete regeneration or near complete regeneration cannot be achieved. Since the cation exchange unit must be taken out of service for regeneartion, it is highly desirable to improve the regeneration so that the unit will be on stream a greater percentage of the time.

It is not known exactly why there is a gradual loss of cation exchanger capacity for ions such as ferrous iron, calcium and magnesium by cation exchange resins; however, it is now believed that the build-up of ferric iron on the resin which will not exchange for sodium ions during regeneration with strong sodium chloride solution is a significant factor.

Loss of ion exchange capacity due to the build-up of ferric ions on a cation exchange resin causes a waste in salt used to regenerate the resin and decreases the amount of water which can be softened before the resin is regeneerated. These two effects add materially to the cost of softening water with a resin.

It has now been unexpectedly discovered that greatly improved regeneration can be achieved if the exhausted cation exchange resin is first washed with sodium chlorid solution then treated with a dilute solution of an iron chelating agent, and finally washed with a sodium chloride solution.

Summary of the invention

The instant invention is directed to improving the regeneration of cation exchange resins. More particularly, the invention is directed to a process of regenerating exhausted cation exchange resins to an ion-exchange capacity substantially equal to the capacity before its exhaustion.

Cation resin regeneration can be unexpectedly improved by treating the cation exchange resin with a dilute solution of an iron chelating agent between two conventional NaCl solution washings.

Brief description of preferred embodiment

The essential feature of the present process is the treatment of the exhausted cation exchange resins with an iron chelating agent between the conventional treatments with the regenerating electrolyte solution.

The particular cation exchange resins form no part of the instant process and any cation exchange resin is suitable for use in the instant process. Cation exchange resins are well-known, particularly for water-softening techniques. For a more detailed description of the theory, preparation and regeneration of cation exchange resins see "Ion Exchange," Helfferich, McGraw-Hill Book Company, Inc (1962), particularly pages 29–47 and "Ion Exchange Resins," Kunin, John Wiley and Sons, Inc., second edition (1958), particularly pages 82–97.

As noted hereinbefore, any cation exchange resin can be effectively regenerated by the instant process; however, excellent results are obtained when the cation exchange resin is a sulfonic acid cation resin, carboxylic type cation resin, a sulfonated phenolic resin, a carboxylic sulfonic resin as well as the phosphoric, phosphonic and phosphorous acid resins and aluminum silicate resins. All these types are commercially available. For a list of the major commercially available cation exchange resins see "Ion Exchange Resins," Kunin, John Wiley and Sons, Inc., second edition (1958), table 13. In addition, the patent literature is replete with descriptions of the preparation of suitable cation exchange resins. See, for example, U.S. 2,860,109, U.S. 2,877,191, U.S. 2,885,371, U.S. 2,891,014, U.S. 2,898,311, U.S. 3,030,317 and U.S. 3,275,575, among many others.

As noted hereinbefore, any of the above-referred to cation exchange resins which have become exhausted is first washed with a solution containing $Na^+$ ions such as NaCl. After this washing, the resin is washed with a dilute solution of an iron chelating compound and then washed again with the sodium chloride solution.

In general, any iron chelating compound may be employed such as hydrogen cyanide, oxalic acid, salicylic acid, sulfosalicyclic acid, thioglycolic acid, the phenathroline derivatives, mercapto-acetic acid, citric acid, and ethylene-diaminetetraacetic acid and the water-soluble salts thereof. Of these, mercaptoacetic acid, citric acid and ethylenediaminetetraacetic acid are preferred.

In general, the iron chelating compound is utilized as a dilute solution, and preferably as a 0.05% to 5.0% by weight solution, and more preferably from about 0.1 to 3%.

The washing solution containing $Na^+$ ions is employed in the conventional concentrations and amounts. In general, 15% by weight of NaCl is employed. Any conventional technique of regeneration may be employed including the co-current and counter-current methods as well as a combination thereof.

The following laboratory and field data are presented in order to illustrate the process of the invention. Unless otherwise specified, parts and percentages are given by weight. All resin capacities are in milli-equivalents per gram of dry cation resin when in the regenerated ($Na^+$) form. A cation exchange resin having a capacity of 4.0 milliequivalents per gram, for example, will remove 4.0 milliequivalents of any cation per gram of resin. Calcium has an atomic weight of 40 and a valence of 2, so that a milliequivalent weight of 20 milligrams (20 grams/ 1000) would be removed by the resin in the ration of 80 milligrams (20×4.0) of calcium per one gram (1000 milligrams) of resin.

The chemical analysis of the unsoftened water used in the following examples is as follows:

| Constituents | Parts Per Million | | |
|---|---|---|---|
| | Yorba Linda | Coalinga | Kern River |
| Carbonate, $CO_3$ | 0 | 0 | 0 |
| Bicarbonate, $HCO_3$ | 130 | 220 | 146 |
| Chloride, Cl | 72 | 241 | 334 |
| Sulfate, $SO_4$ | 269 | 3,120 | 352 |
| Barium, Ba | 0 | 0 | 0 |
| Calcium, Ca | 81 | 107 | 11 |
| Magnesium, Mg | 26 | 30 | 4 |
| Sodium and Potassium, NaK | 89 | 1,554 | 420 |
| Silica, $SiO_2$ | 10 | 43 | 20 |
| Iron, Fe | Tr. | 0.47 | 0 |
| Total dissolved solids: | | | |
| By addition | 617 | 5,312 | 1,287 |
| 105° C | | 4,915 | 1,098 |
| Salinity (NaCl) | | 398 | 550 |
| Total Hardness ($CaCO_3$) | 307 | 392 | 44 |
| Resistivity (ohmmeters at 74° F.) | | 1.58 | 5.22 |
| pH | 8.4 | 7.30 | 7.25 |

The cation-exchange resins utilized in the examples were Permutit Q (sufonated polystyrene copolymer) and Amberlite 1R 120 (sulfonated styrene divinylbenzene copolymer).

EXAMPLE I

The following laboratory procedure was employed to measure the cation of exchange capacity and regeneration effectiveness of a number of iron chelating agents:

(1) Wash about 50 mls. of resin (Amberlite 1R 120 or Permutit Q) from the primary water softener at the Yorba Linda, Calif., fields with distilled water.

(2) Add about 32 mls. of the washed resin to a glass column (1 7/16" I.D., 21" long, valved outlets at top and bottom and a fritted glass filter at the bottom).

(3) Rinse with two approximate 500 ml. increments of distilled water (co-current).

(4) Regenerate with exactly 1 liter of 10% NaCl at a rate of 200 ml./min. (co-current).

(5) Rinse until chloride free (co-current).

(6) Remove water from resin by filtering through No. 50 filter paper using a Buchner funnel and a vacuum flask.

(7) If the cation exchange resin is to be treated, perform steps a, b, c, and d. If the cation exchange resin is not to be treated, proceed to step 8.

(a) Add desired chemical at desired strength to the resin and allow to stand for desired time, generally one hour.

(b) Put resin back into column and backwash with about 3 liters of distilled water (counter-current).

(c) Rinse with about 2 liters of distilled water (co-current).

(d) Repeat steps 4, 5, and 6 above.

(8) Weigh-out two approximate 5-gram portions of resin (weighted accurately to 0.1 milligram) in pre-weighed watch glasses. These two weighings must be performed within one minute of each other. The first of the two 5-gram portions is put back into the column and handled according to steps 9, 10, 11, and 12, while the second of the two 5-gram portions is dried to a constant weight at 106° C.

(9) Add exactly one liter of 4% HCl (200 ml./min. co-current).

(10) Add exactly 1.5 liters of distilled water (200 ml./min. co-current). After this wash, the effluent should be yellow to methyl orange; if not, add a second 1.5 liters of distilled water (200 ml./min.).

(11) Add exactly one liter of 4% $Na_2SO_4$ (200 ml./min. co-current).

(12) Recover the effluent from step 11 and titrate exactly 100 ml. using 0.1 N NaOH and phenolphthalein.

(13) Calculations:

$$\text{Percent Solids} = \frac{\text{Dry Weight}^1}{\text{Wet Weight}} 100$$

[1] From 2nd 5-gram portion which was dried at 106° C.

Milliequivalents/gram of dry resin in the sodium form=

$$\frac{\text{ml. of 0.1 N NaOH}}{\text{(grams sample put back into column from step 8)(percent solids)}}$$

The results are tabulated in Table I.

EXAMPLE II

The procedure of Example I was substantially repeated wherein the cation exchange resins were taken from the primary water softeners in the Coalinga fields, California.
The results are tabulated in Table II.

EXAMPLE III

The procedure of Example I was substantially repeated wherein the cation exchange resin was obtained from the primary and polishing water softening units in the Kern River fields, California.

The results are tabulated in Table III wherein the capacity of the resin "as is" (untreated) and after treatment with mercaptoacetic acid (½% by weight solution) are compared.

TABLE I.—YORBA LINDA PRIMARY WATER SOFTENERS—CATION

| Restoration = $\frac{\text{(Cap. after Treat.)} - \text{(Cap. as is)} \times 100}{\text{(Cap. New)} - \text{(Cap. as is)}}$ (All capacities in MEQ/G) | | Permutit Q Resin Capacity (New)=4.51 Capacity (as is)=3.98 | | Amberlite IR 120 Capacity (New)=4.36 Capacity (as is)=4.05 | |
|---|---|---|---|---|---|
| Chemical | Recommended Amount [1] | Capacity after Treatment | Percent Restoration | Capacity after Treatment | Percent Restoration |
| Sterimine [2] | 0.013 | 4.08 | 19.0 | 4.34 | 99.4 |
| Lykopon [3] | 0.5 | 4.35 | 70.0 | 4.22 | 55.0 |
| Rover [4] | 1.0 | 4.18 | 33.3 | 4.20 | 48.5 |
| Fer Rid [5] | 1.0 | 4.42 | 84.0 | 4.30 | 80.5 |
| Mercaptoacetic Acid | 0.042 | 4.49 | 100.0 | 4.35 | 100.0 |
| Citric Acid | 0.33 | 4.47 | 94.5 | 4.34 | 93.0 |
| Kleen Ion [6] | 2.0 | 4.36 | 72.6 | 4.28 | 74.0 |
| $Na_2$ EDTA | 0.20 | 4.42 | 85.0 | 4.29 | 77.5 |
| Permutit Resin [7] Cleaner No. 1112 | 1.25 | 4.37 | 73.6 | 4.28 | 74.0 |
| Versene 100 (38% $Na_4$ EDTA) | 0.6 | 4.45 | 90.5 | 4.33 | 91.6 |

[1] Lbs. of chemical/ft.³ of resin.
[2] Trichloromelamine compounded with salt, wetting agent, and acid phosphate buffer. Available chlorine 50%.
[3] Sodium hydrosulfide ($Na_2S_2O_4$).
[4] Some form of sulfite (Hach Chemical Company).
[5] Sodium hydrosulfide ($Na_2S_2O_4$).
[6] Blend of chlorine-containing chemicals.
[7] Unknown composition.

TABLE II.—COALINGA PRIMARY WATER SOFTENERS—CATION $$\text{Restoration} = \frac{(\text{Cap. after Treat.}) - (\text{Cap. as is}) \times 100}{(\text{Cap. New}) - (\text{Cap. as is})}$$
(All capacities in MEQ/G)

Permutit Q Resin
Capacity (New)=4.51
Capacity (as is)=4.18

Amberlite IR 120
Capacity (New)=4.36
Capacity (as is)=3.80

| Chemical | Recommended Amount [1] | Capacity after Treatment | Percent Restoration | Capacity after Treatment | Percent Restoration |
|---|---|---|---|---|---|
| Sterimine [2] | 0.013 | 4.22 | 12.0 | 4.15 | 54.0 |
| Lykopon [3] | 0.5 | 4.43 | 76.0 | 4.26 | 82.0 |
| Rover [4] | 1.0 | 4.45 | 82.0 | 4.27 | 84.0 |
| Fer-Rid [5] | 1.0 | 4.48 | 92.0 | 4.22 | 75.0 |
| Mercaptoacetic Acid | 0.042 | 4.52 | 100.0 | 4.37 | 100.0 |
| Citric Acid | 0.33 | 4.48 | 92.0 | 4.31 | 94.5 |
| Kleen-Ion [6] | 2.0 | 4.36 | 84.6 | 4.20 | 71.5 |
| Na₂ EDTA | 0.20 | 4.42 | 72.5 | 4.25 | 80.2 |
| Permutit Resin Cleaner No, 1112 [7] | 1.25 | 4.44 | 79.0 | 4.24 | 78.5 |
| Versene 100 (38% Na₄ EDTA) | 0.6 | 4.47 | 88.0 | 4.29 | 87.5 |

[1] Lbs. of chemical/ft.³ of resin.
[2] Trichloromelamine compounded with salt, wetting agent, and acid phosphate buffer. Available chlorine 50%.
[3] Sodium hydrosulfide ($Na_2S_2O_4$).
[4] Some form of sulfite (Hach Chemical Company).
[5] Sodium hydrosulfide ($Na_2S_2O_4$).
[6] Blend of chlorine-containing chemicals.
[7] Unknown composition.

Table III.—KERN RIVER WATER SOFTENERS—CATION

| Unit from Which Sample was Taken | Capacity as is (MEQ/G) | Capacity when Treated with Mercaptoacetic Acid (MEQ/G) | (Probable) [1] Percent Recovery of Lost Capacity |
|---|---|---|---|
| Primary Unit | 3.80 | 3.96 | 100.0 |
| Polisher Unit | 3.91 | 4.0 | 100 |

[1] Original (New) sample of this resin was not available. The exact capacity of the resin when new was, therefore, not determined. However, the ease in reproducing the above results and the experience gained from the treatment of Yorba Linda and Coalinga resins with mercaptoacetic acid, show that the capacity of the resin, when new, would be about (3.90 to 4.0 MEQ/G).

EXAMPLE IV

This example illustrates the advantages of the instant method for improving the regeneration of cation exchange resins on a field test basis. The operational data for the Yorba Linda exchange units are tabulated in Table IV wherein Units 1 and 3 are essentially identical:

TABLE IV

| | Units 1 and 3 | Unit 5 |
|---|---|---|
| Vessel: | | |
| Manufacturer | Permutit Co | Los Anbeles Water Conditioning Co. |
| Size | 66″ diam. x 5′ height | 60″ diam. x 5′ height. |
| Resin: | | |
| Name | Permutit Q | Rohm and Haas Amberlite IR 120. |
| Composition | Sulfonated polystyrene copolymer. | Sulfonated styrene divinylbenzene copolymer. |
| Amount (Ft.³) | 72 | 72. |
| Operation Cycles: | | |
| Backwash: | | |
| Type of water | Process | Process. |
| Amount | 1,890 gallons | 1,890 gallons. |
| Flow direction | Counter-current | Counter-current. |
| Flow rate | 140 gal./min | 140 gal./min. |
| Regenerating: | | |
| Type of solution | 15% NaCl | 15% NaCl. |
| Amount | 450 gallons | 450 gallons. |
| Flow direction | Co-current | Co-current. |
| Flow rate | 15 gal./min | 15 gal./min. |
| Softening (Process): | | |
| Type of water | 342 p.p.m. total hardness as CaCO₃. | 342 p.p.m. total hardness as CaCO₃. |
| Flow direction | Co-Current | Co-Current. |
| Flow rate | 45 gal./min | 45 gal./min. |

The following procedure was used on primary cation exchange unit 1:
(1) Regeneration in usual manner.
(2) Water level adjusted to about 1-inch above top of resin bed.
(3) Mercaptoacetic acid added to give a final solution of ½% by weight.
(4) Water added with high pressure hose to two-feet above resin bed.
(5) Unit allowed to stand for one-hour, then gravity drained.
(6) Unit backwashed.
(7) Unit regenerated.
(8) Unit placed in operation.

The following procedure was used on primary cation exchange unit 3:
(1) Regeneration in usual manner.
(2) Unit backwashed.
(3) Unit regenerated.
(4) Unit placed in operation.

Thus, Unit 3 was untreated and Unit 1 was treated with ½% by weight of mercaptoacetic acid between regeneration cycles.

When placed in operation after regeneration, the initial softened water from Unit 3 (untreated) had a hardness of 5 p.p.m. as $CaCO_3$ while the water from Unit 1 (treated) had a hardness of only 2 p.p.m. as $CaCO_3$.

The treated water was then analyzed for hardness at frequent intervals. In every instance, the quantity of water softened per hardness increment was greater from the treated unit (Unit 1) than from the untreated unit (Unit 3) as shown by the following tabulation:

| | Gallons of water treated, gals. × 10³ | |
|---|---|---|
| | Unit 3 (untreated) | Unit 1 (treated) |
| Hardness (p.p.m. as CaCO₃): | | |
| 10 | 59 | 82 |
| 20 | 62 | 83 |
| 30 | 63 | 84 |
| 40 | 64 | 84 |
| 50 | 66 | 85 |
| 75 | 68 | 86 |
| 100 | 70 | 88 |

EXAMPLE V

The procedure of Example IV was substantially repeated on primary unit No. 5 of the Yorba Linda field water softening units wherein a run was made before treatment and a run made after treatment with ½% by weight of mercaptoacetic acid.

The initial hardness of treated water before treatment was 4 p.p.m. as $CaCO_3$ and after treatment was 2 p.p.m. as $CaCO_3$.

The quantity of water processed (softened) was frequently analyzed to determine the quantity of water softened per increment of hardness. The results are tabulated as follows:

| | Gallons softened, gals. × 10³ | |
|---|---|---|
| | Untreated | Treated |
| Hardness: | | |
| 10 | 62 | 72 |
| 20 | 64 | 76 |
| 30 | 66 | 79 |
| 40 | 67 | 81 |
| 50 | 69 | 84 |

We claim:
1. A process for restoring the water-softening capacity of cation exchange resins which comprises the steps of washing the exhausted cation exchange resin with (1) a NaCl solution, (2) a 0.05 to 5.0% by weight solution of mercaptoacetic acid and then (3) a NaCl solution.
2. A process as in claim 1 wherein the mercaptoacetic acid is utilized as a 0.1% to 3.0% by weight solution.
3. A process as in claim 1 wherein the cation exchange resin is a nuclear sulfonic acid cation exchange resin.

References Cited

UNITED STATES PATENTS 3,262,883   7/1966   Fisher _____ 252—105

OTHER REFERENCES

Maatschappij, Chem. Abstr. 63, 12717e (1965).
Laanpere et al., Chem. Abstr. 64, 10441e (1966).
Sequestrene, Geigy Industrial Chemicals, 1952 (p. 30).

WILLIAM H. SHORT, *Primary Examiner.*

L. P. QUAST, *Assistant Examiner.*

U.S. Cl. X.R.

210—32